United States Patent
Watanabe et al.

(10) Patent No.: US 11,487,114 B2
(45) Date of Patent: Nov. 1, 2022

(54) DISPLAY DEVICE AND HEAD-UP DISPLAY DEVICE

(71) Applicant: NIPPON SEIKI CO., LTD., Niigata (JP)

(72) Inventors: Yuki Watanabe, Niigata (JP); Takayuki Hatano, Niigata (JP); Akinori Koiida, Niigata (JP); Chiaki Shibuya, Niigata (JP); Yujiro Inoue, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 17/257,344

(22) PCT Filed: Jul. 9, 2019

(86) PCT No.: PCT/JP2019/027081
§ 371 (c)(1),
(2) Date: Dec. 31, 2020

(87) PCT Pub. No.: WO2020/013160
PCT Pub. Date: Jan. 16, 2020

(65) Prior Publication Data
US 2021/0271078 A1    Sep. 2, 2021

(30) Foreign Application Priority Data

Jul. 11, 2018 (JP) .............................. JP2018-131389
Dec. 5, 2018 (JP) .............................. JP2018-228154

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS

2017/0276936 A1    9/2017 Shihaku et al.
2017/0320390 A1*  11/2017 Sato .................. G02B 27/0101
(Continued)

FOREIGN PATENT DOCUMENTS

JP    2016-061978 A    4/2016
JP    2017-174542 A    9/2017
(Continued)

OTHER PUBLICATIONS

International Search Report issued in corresponding International Patent Application No. PCT/JP2019/027081, dated Sep. 10, 2019, with English translation.

*Primary Examiner* — Christopher A Lamb, II
(74) *Attorney, Agent, or Firm* — McDermott Will & Emery LLP

(57) ABSTRACT

The purpose of the present invention is to provide a head-up display having enhanced evenness of display image luminance. This head-up display is provided with: a backlight unit having a light source, the backlight unit emitting illumination light; a liquid crystal display element for displaying an image, the image being irradiated by the illumination light, whereby the liquid crystal display element emits display light; a control means for controlling the illuminance of the backlight unit and display by the liquid crystal display element; a housing having an opening through which the display light passes, the housing housing the liquid crystal display element and the backlight unit; and a cover glass for reflecting and/or transmitting in at least one
(Continued)

location in a display light path and projecting the reflected and/or transmitted display light.

4 Claims, 17 Drawing Sheets

(52) U.S. Cl.
    CPC .... *B60K 2370/23* (2019.05); *G02B 2027/011* (2013.01); *G02B 2027/0118* (2013.01)

(56) References Cited

U.S. PATENT DOCUMENTS

| | | | | |
|---|---|---|---|---|
| 2020/0174253 A1* | 6/2020 | Nambara | ................ | B60K 35/00 |
| 2020/0284952 A1* | 9/2020 | Uchida | ................ | G02B 3/0043 |

FOREIGN PATENT DOCUMENTS

| | | | |
|---|---|---|---|
| JP | 2018-045143 A | 3/2018 |
| JP | 2018-054715 A | 4/2018 |
| JP | 2019-086560 A | 6/2019 |
| WO | 2017/195741 A1 | 11/2017 |

* cited by examiner

DISPLAY DEVICE AND HEAD-UP DISPLAY DEVICE

CROSS REFERENCE

This application is the U.S. National Phase under 35 U.S.C. § 371 of International Application No. PCT/JP2019/027081, filed on Jul. 9, 2019, which claims the benefit of Japanese Application No. 2018-131389, filed on Jul. 11, 2018 and Japanese Application No. 2018-228154, filed Dec. 5, 2018, the entire contents of each are hereby incorporated by reference.

TECHNICAL FIELD

The present invention relates to a display device and a head-up display device.

BACKGROUND ART

As a conventional head-up display device, for example, there is a head-up display device as described in Patent Documents 1 and 2. That is, the head-up display device is a device that includes a display unit that emits display light, a mirror that reflects the display light, a housing that has an opening through which the display light passes, and a cover glass that covers the opening, so as to project the display light emitted from the opening toward the windshield of a vehicle, and allows the driver to visually recognize image displayed on the display unit.

The cover glass is produced by attaching a flat transparent plate, for example, an acrylic resin or a polycarbonate resin, to the opening while curving the flat transparent plate. This curvature acts as a glare trap. Therefore, it is possible to reduce a risk that the light transmitted from the outside of the vehicle through the windshield and incident on the inside of the vehicle (mainly sunlight) is reflected in the direction of the viewpoint of the driver.

PRIOR ART DOCUMENT

Patent Document

Patent Document 1: Japanese Unexamined Patent Publication No. 2018-54715
Patent Document 2: PCT International Publication No. 2017/195741 Pamphlet

SUMMARY OF THE INVENTION

Problems to be Solved by the Invention

Meanwhile, according to the above head-up display device, when a transmissive member is provided on the display optical path, the luminance variation of the display image visually recognized by the driver becomes large due to the optical path.

Therefore, the present invention has been made in view of the circumstances described above, and provides a display device and a head-up display device having enhanced evenness of display image luminance.

Solution to Problem

In order to achieve the above purpose, a display device includes an illumination unit which includes a light source and emits illumination light; a display unit which displays an image and emits display light when the image is illuminated with illumination light; a control unit which controls illuminance of the illumination unit and display of the display unit; a housing which includes an opening through which the display light passes, and houses the display unit and the illumination unit; and an optical system which performs at least one of reflection and transmission at at least one portion in a display optical path, and projects the display light that has passed through the display optical path. The optical system includes a predetermined attenuation rate distribution with respect to visible light in a projection direction of the display light, wherein the attenuation rate distribution is non-point symmetric with respect to a display optical axis, and wherein the illumination unit emits illumination light of an illumination optical axis at which a predetermined angle is provided with respect to the display optical axis, to improve the evenness of the display image luminance.

In order to achieve the above purpose, a head-up display device is a head-up display device for emitting an image including vehicle information as display light and projecting the image to a transmissive reflective member of a vehicle, to provide the vehicle information to an occupant of the vehicle, and includes an illumination unit which includes a light source and emits illumination light; a display unit which displays the image and emits the display light when the image is illuminated with the illumination light; a control unit which controls illuminance of the illumination unit and display of the display unit; an optical system which provides the display light to the occupant by performing both reflection and transmission at at least one portion in a display optical path; a housing which includes an opening through which the display light passes, and houses the display unit, the illumination unit, and the optical system; and a cover glass which is formed of a transparent member including a uniform thickness, covers the opening, transmits the display light, and constitutes a portion of the optical system. The optical system includes a predetermined attenuation rate distribution with respect to visible light in a projection direction of the display light. The attenuation rate distribution is non-point symmetric with respect to a display optical axis. The illumination unit emits the illumination light which is an illumination optical axis, at which a predetermined angle is provided with respect to the display optical axis, to improve the evenness of display image luminance.

The display device and the head-up display device realize the improvement in evenness of the display image luminance. The display image luminance refers to the value of the luminance of a display image when the display image is visually recognized from a certain viewpoint.

The evenness of the display image luminance is an index showing the degree of luminance variation in the measurement results obtained by measuring the luminance of a display image from a plurality of visible viewpoints. The evenness of display image luminance is defined by, for example, the ratio of the maximum value to the minimum value in the luminance data of the luminance in the central pixel of a display image measured from nine viewpoints. Although the setting of the plurality of viewpoints is generally point-symmetric, it is also acceptable to be intensively observed in a region in which the evenness is emphasized in terms of product characteristics. Further, the target of the ratio may be arbitrarily specified in consideration of the product characteristics.

The attenuation rate for light refers to the ratio of energy before and after refection or transmission of light.

Effect of the Invention

According to the present invention, a display device and a head-up display device having enhanced evenness of display image luminance are provided.

BRIEF DESCRIPTION OF THE DRAWINGS

FIG. 9 is a diagram showing a cross section of a head-up display 10a.

MODE FOR CARRYING OUT THE INVENTION

Hereinafter, a display device and a head-up display device of the present disclosure will be described as examples of the embodiments and modifications, and will be described in the following order with reference to the accompanying drawings.
1. First Embodiment
1-1. DESCRIPTION OF CONFIGURATION
1-2. PREDETERMINED ANGLE SETTING.
2. MODIFICATION EXAMPLE
2-1. FIRST MODIFICATION EXAMPLE
2-2. MODIFICATION EXAMPLE OF ILLUMINATION UNIT AND DISPLAY UNIT
2-3. OTHER MODIFICATION EXAMPLES
3. EFFECT EXAMPLE

1. First Embodiment

1-1. Description of Configuration

Figure 1:
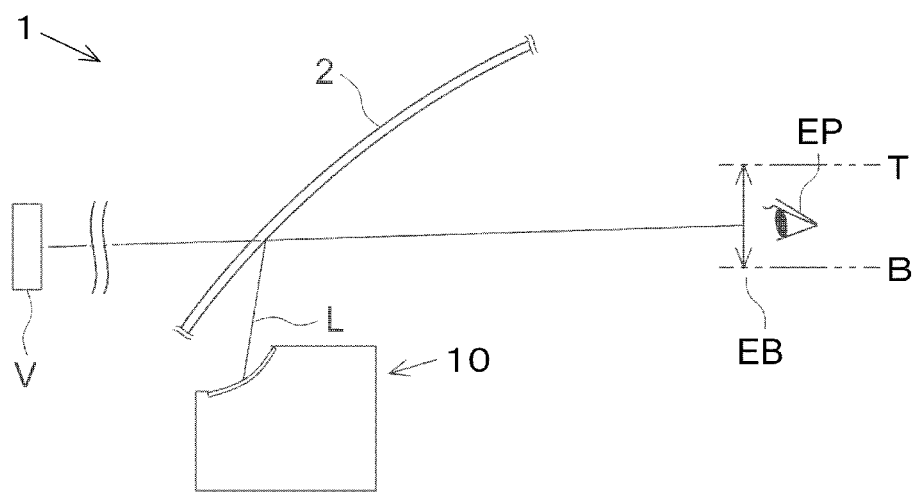
FIG. 1 is a diagram showing a state in which a head-up display device of a first embodiment is assembled to a vehicle.

As shown in FIG. 1, a head-up display 10 (display device, head-up display device) is disposed inside an instrument panel below a windshield 2 of a vehicle 1. The head-up display 10 emits display light L, and projects the display light L onto the windshield 2. The display light L is generated by an illumination unit and a display unit inside the head-up display 10. The generated display light L is emitted from an opening of a housing 50 via an optical system (a cold mirror 31, a concave mirror 32, and a cover glass 33). An occupant (user) visually recognizes the display light L reflected on the windshield 2 (light that reaches a viewpoint EP among first display light and second display light, which will be described later) from the viewpoint EP in an eye box EB having an upper end T, a lower end B, a right end, and a left end, so that rectangular display image V appears to float several meters away from the viewpoint. The display image V displays information that is highly necessary to alert the occupant (user), for example, vehicle information such as a speed or an engine speed, a route guidance display such as a turn-by-turn or a map, a warning indication such as a blind side indicator or a speed limit excess warning, and the like. This provides a driving environment in which the need for viewpoint movement and eye focal length adjustment is reduced. The display image V includes a background portion in addition to a character and an icon that indicate such information, and has a rectangular shape in a plan view from the occupant.

Figure 2:
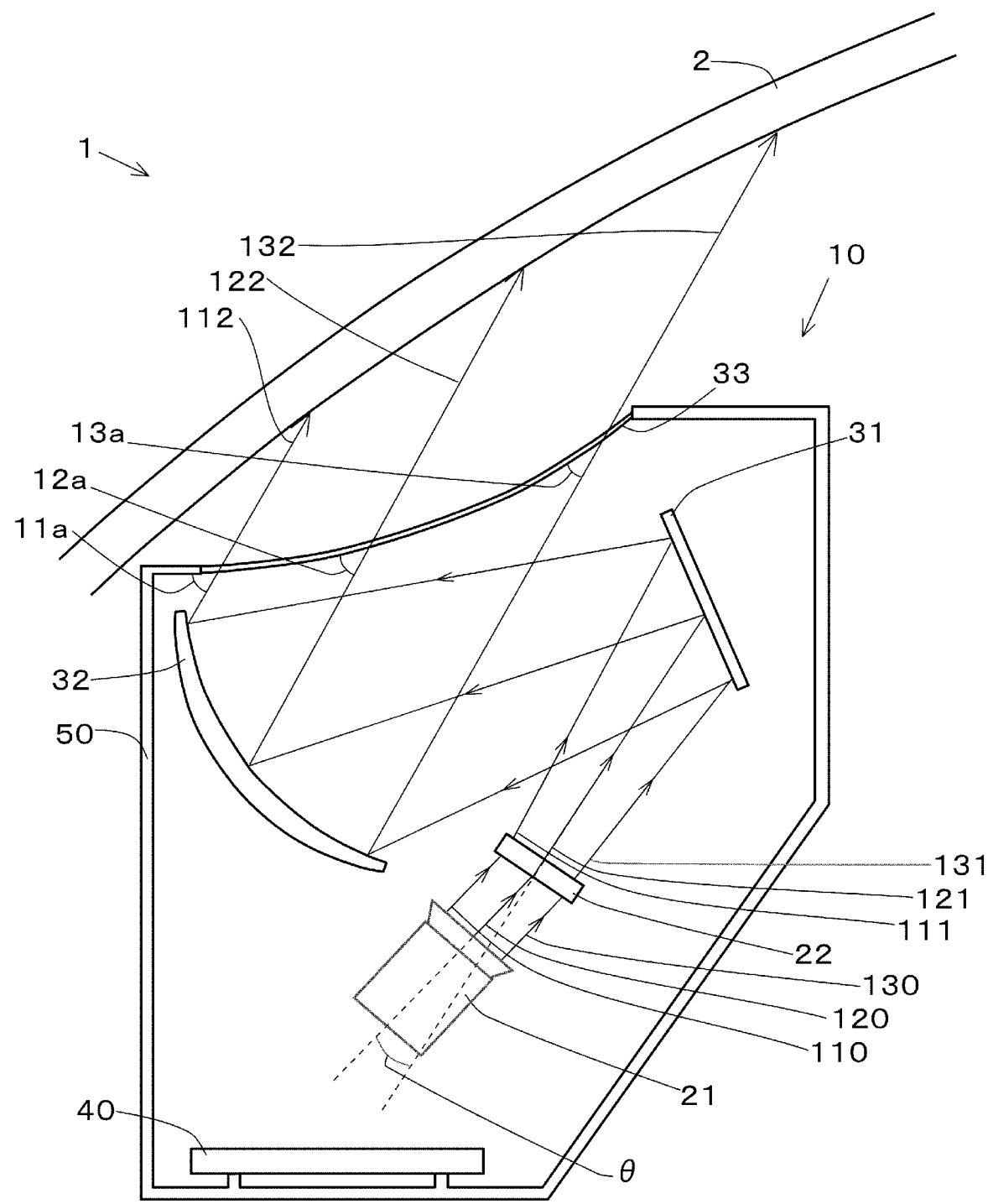
FIG. 2 is a diagram showing a cross section of a head-up display 10 of the first embodiment.

The configuration of the head-up display 10 is shown with reference to FIG. 2.

The head-up display 10 includes a projection type image display unit 21, a screen 22, the cold mirror 31, the concave mirror 32, the cover glass 33, a control unit 40, and a housing 50.

Figure 3:
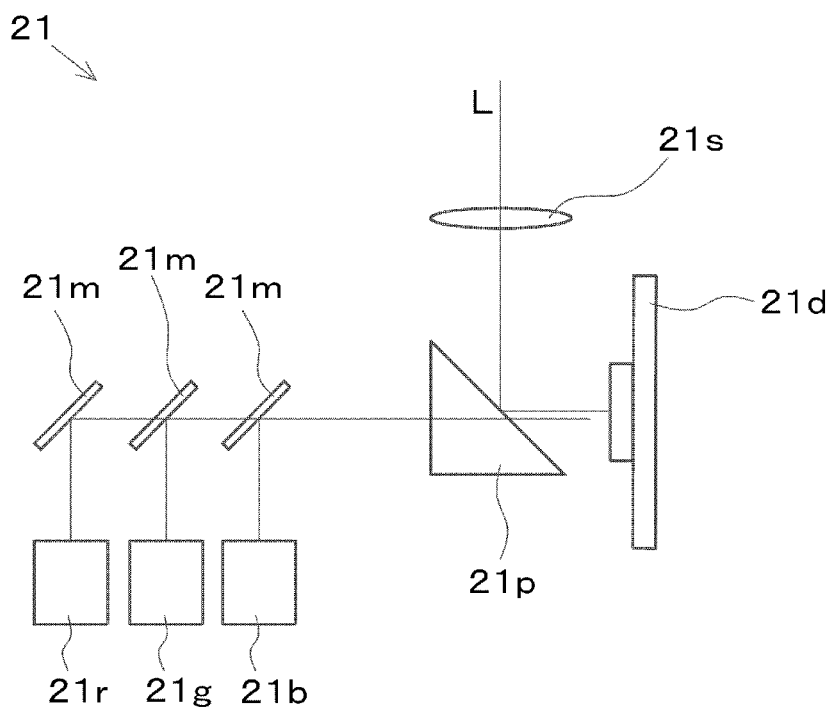
FIG. 3 is a diagram showing a cross section of a projection type image display unit 21.

The configuration of the projection type image display unit 21 will be described with reference to FIG. 3. The projection type image display unit 21 emits illumination light by a field sequential method, and has a red light source 21r, a green light source 21g, a blue light source 21b, a dichroic mirror 21m, a DMD 21d, a prism 21p, and a projection lens unit 21s.

The red light source 21r, the green light source 21g, and the blue light source 21b are configured by the respective color LED, and are sequentially turned on according to a signal transmitted from the control unit 40 electrically connected thereto. When each of the light source 21r, the light source 21g, and the light source 21b is turned on, each of the light source 21r, the light source 21g, and the light source 21b emits the respective color light beam toward each dichroic mirror 21m located in the upward direction of the drawing of each light source. In addition to configuring each of the light source 21r, the light source 21g, and the light source 21b with the respective color LED, each of the light source 21r, the light source 21g, and the light source 21b can also be configured by a white LED provided with a transmissive color filter of the respective color in the emission direction, and further can be configured by a color filter which is a rotation transmission type, and in which the respective colors is evenly applied to the outer edge. The light sources are an illumination unit, and the respective color components constitute a display unit of the present invention with a part of the display unit, each member of the subsequent projection type image display unit 21, and the screen 22.

The dichroic mirror 21m is a reflection transmissive member capable of transmitting or reflecting light in a predetermined wavelength range, and transmits or reflects the respective color light beams to/from the DMD 21d.

The DMD 21d, which is a digital mirror device, is a light modulation element that reflects light in a predetermined direction by changing the angles of minute mirrors arranged in a matrix on the incident surface in accordance with a control signal from the control unit 40. According to the present embodiment, each color light beam, which is transmitted or reflected through the dichroic mirror 21m according to the angles of the mirrors, is reflected in a direction different from the direction of the prism 21p and in a direction that does not affect the display of the display image V.

The prism 21p is a prism that transmits each color light beam incident on the DMD 21d and is held so as to reflect each color light beam reflected from the DMD 21d toward the projection lens unit 21s.

The projection lens unit 21s is configured by at least one lens, and magnifies and emits the light beam reflected by the prism 21p as illumination light.

That is, the projection type image display unit 21 generates the illumination light by selectively reflecting each color light source by the above-described configuration. The illumination light has directivity, and according to the embodiment, in particular, the illumination lights that illuminate the lower end, the center, and the upper end of the eye box are referred to as lower end illumination light 110, central illumination light 120 (illumination optical axis), and upper end illumination light 130, respectively. That is, the illumination optical axis means the illumination light in the central portion of the illumination light in the projection direction.

The screen 22 is a transmissive screen that can be configured by a micro lens array, a diffusion plate, and the like, and is a member that diffuses and transmits toward the cold mirror 31. The screen 22 emits first display light by being irradiated with the illumination light. In particular, the display lights, each of which correspond to the optical path connecting the lower end B, the center, and the upper end T of the eye box EB from the lower end, the center, and the upper end of the display image V and is immediately emitted from the screen 22 in the first display light, is referred to as first lower end display light 111, first central display light (display optical axis) 121, and first upper end display light 131, respectively.

There is a configuration such that an image is displayed by other than the light sources of the projection type image display unit 21 and the screen 22, and the light sources emit the illumination light, so that the display light L is emitted from the screen 22.

The cold mirror 31 is a reflective member, which is formed by forming a multilayer interference film having different film pressures on one surface of a plate-shaped glass member by a method such as vapor deposition, transmits infrared light, and reflects at least visible light. The cold mirror 31 is held by the housing 50, which will be described later, in a position so as to reflect the first display light to the concave mirror 32.

The concave mirror 32 is a reflective member that reflects the first display light in the direction of the opening (cover glass 33) of the housing 50 while expanding the first display light.

A transparent synthetic resin member having a uniform thickness is applied to the cover glass 33, which is configured by, for example, PMMA (poly methyl methacrylate) or polycarbonate. The cover glass 33 is glued while curving to cover the opening of the housing 50. The transparent resin member has a light transmittance of 90% or more with respect to the light beam perpendicular to the surface, and the light transmittance decreases as the incident angle increases. The inventors have found that this is included as one of the causes of unevenness in the light transmittance distribution. That is, in the display light L, the optical path having a large incidence angle on the cover glass 33 decreases in light transmittance, and thus becomes the cause of the decrease in evenness of the display image luminance.

The incident angles formed by the first display light and the cover glass 33 are referred as a lower end optical path incident angle 11a, a central optical path incident angle 12a, and an upper end optical path incident angle 13a, respectively. The lower end optical path incident angle 11a is the smallest, and the upper end optical path incident angle 13a is the largest.

The first display light transmits the cover glass 33 in the rearward direction of the vehicle 1 with an elevation angle, so that the display light L is emitted from the head-up display. The display light L immediately after being transmitted is referred to as second display light. In particular, in the second display light, the display lights on each extension line from the first lower end display light, the first central display light, and the first upper end display light are referred to as second lower end display light 112, second central display light 122, and second upper end display light 132, respectively.

The control unit 40 can be applied to a microcomputer, which includes a storage unit such as a ROM (read only memory) or RAM (random access memory), which is not shown and used for a storage area for a predetermined program or various data, a storage area for calculation, and the like, a CPU (central processing unit) for executing arithmetic processing according to the predetermined program, an input and output interface, and the like. The control unit 40 generates an image to be displayed on the display unit, controls the display of the display unit, or controls the illuminance of the illumination unit, based on vehicle information received from an external in-vehicle device.

The housing 50 is a housing to which a dark resin molded product can be applied, and has an opening for emitting the display light L to the outside of the device. The cover glass 33 is attached to cover the opening. The projection type image display unit 21, the screen 22, the cold mirror 31, the concave mirror 32, and the control unit 40 are fixed in the inside of the housing 50 by a known method as shown in FIG. 2 such as fitting, locking, bonding with an adhesive member, and screwing with screws. On the other hand, the backlight unit 21a is disposed by providing an illumination optical axis emission angle θ having a predetermined angle with respect to the display optical axis 121 described later.

A method for setting the predetermined angle will be described.

1-2. Predetermined Angle Setting

First, the light transmittance distribution for each optical path until the display light L reaches the eye box EB is obtained.

It is assumed that the member which constitutes the present embodiment and affects the light transmittance distribution is only the cover glass 33. This is for simplification of the explanation, and in fact, since the screen 22 transmits the display light L, it is necessary to consider the screen 22 as well. In addition, to simplify the explanation, it is assumed that the reflectance of each reflective member including the windshield 2 is uniform, and that each optical member is not tilted in the left-right direction of the vehicle 1. This means that the increase or decrease of the light transmittance in the optical path occurs only in the cross-sectional direction component on the display optical path surface in the drawing.

Figure 4:
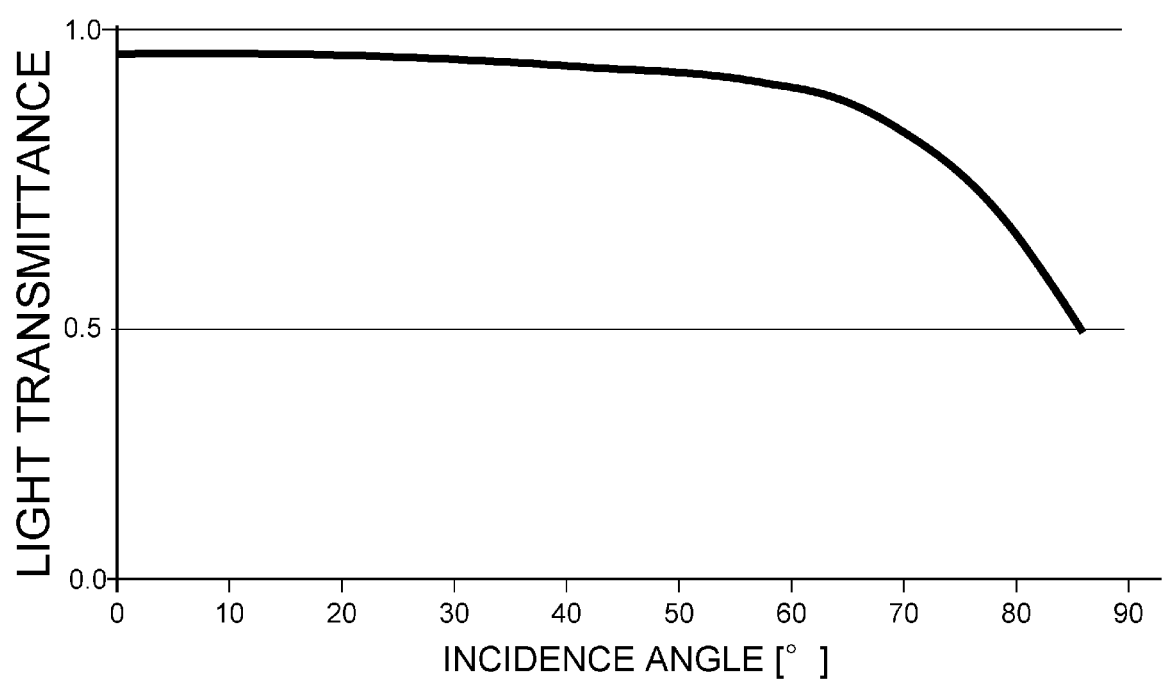
FIG. 4 is a diagram showing an incident angle characteristic of a light transmittance of a cover glass 33.

In the premise of the preceding paragraph, the light transmittance distribution depends on the light transmittance of the cover glass 33. Therefore, the incident angle characteristic of the light transmittance of the cover glass 33 is shown in FIG. 4. The cover glass 33 has the light transmittance of 90% or more when the incident angle of light is 0 degrees, and a non-point-symmetrical incident angle characteristic in which the light transmittance decreases monotonically as the incident angle increases.

Figure 5:
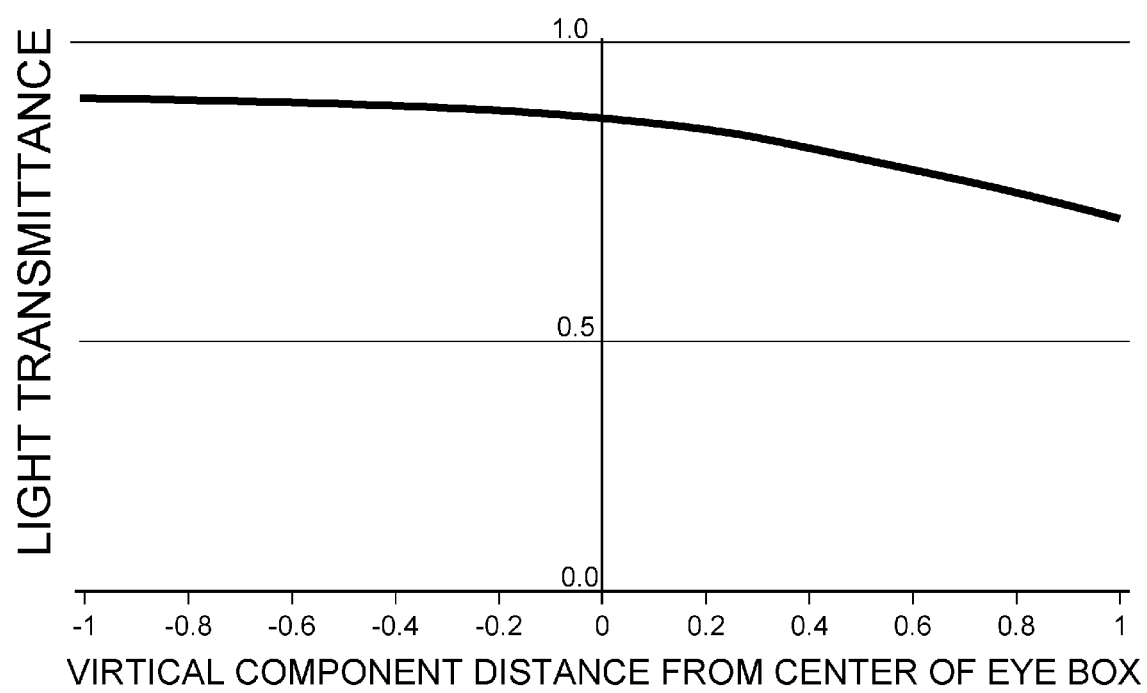
FIG. 5 is a diagram showing a light transmittance distribution in a projection direction of the cover glass 33.

Next, in order to obtain the light transmittance distribution of the head-up display 10 with respect to the position coordinates of the eye box EB in the vertical direction from the incident angle characteristic, the horizontal axis is set as the ratio of the distance of the vertical component from the center of the eye box (The distances from the center of the eye box to each of the upper and lower ends are set to 1, and the vertical upward direction is set to positive. Hereinafter, the horizontal axis in the graphs relating to the present embodiment is equal to this), the vertical axis is set as the incident angle, the incident angle distribution of the display light L on the cover glass 33 is obtained, and a graph of the light transmittance distribution to the eye box is calculated by the incident angle characteristic. The calculated graph is shown in FIG. 5.

Figure 6:
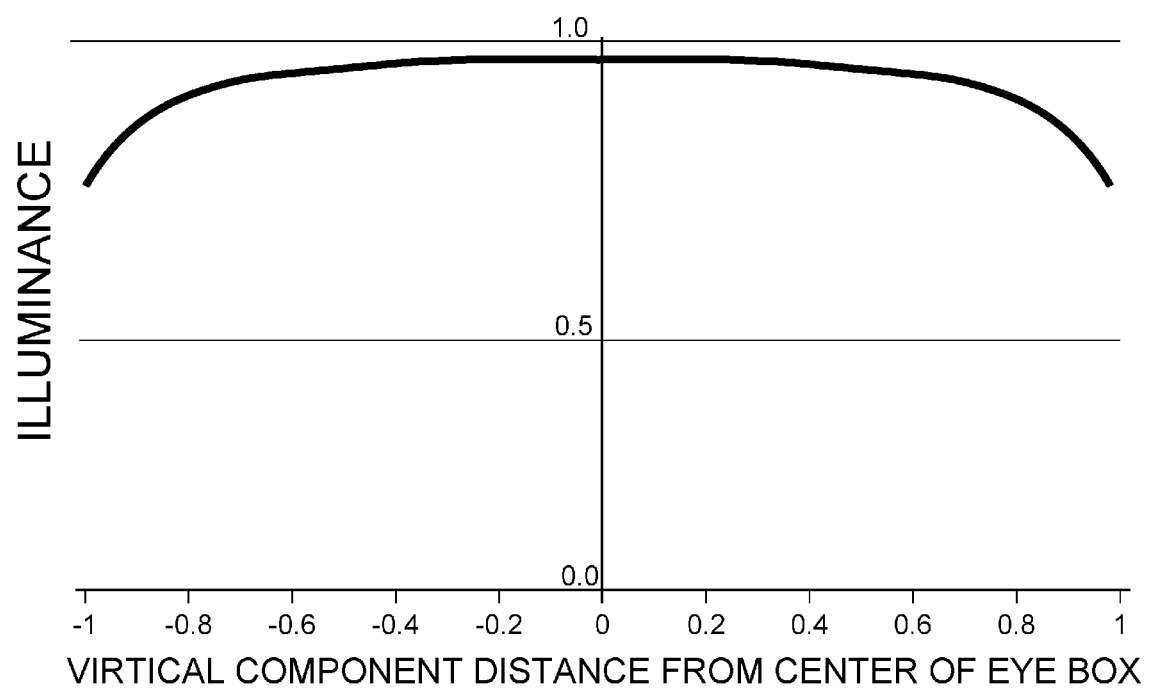
FIG. 6 is a diagram showing an illuminance distribution of the projection type image display unit 21.

Next, the illuminance distribution of the projection type image display unit 21 is shown in FIG. 6. The illuminance distribution shown in FIG. 6 is an illuminance distribution in the upper and lower regions passing through the center in the eye box in the vertical direction, in the arrangement of the conventional method shown in FIG. 11. The vertical axis represents the ratio of the illuminance when the maximum illuminance is 1. There is the illuminance distribution, which has a peak illuminance point around the illumination optical axis, and has directivity such that the illuminance significantly decreases at the outer edge of the irradiation range. The illuminance distribution from the center to the left and right regions in the horizontal direction of the eye box EB has the same illuminance distribution. Under the above premise, there is no unevenness in the light transmittance distribution in the left-right direction of the vehicle. Therefore, in the horizontal component, the maximum evenness is obtained by setting the peak illuminance point to the center.

Figure 7:
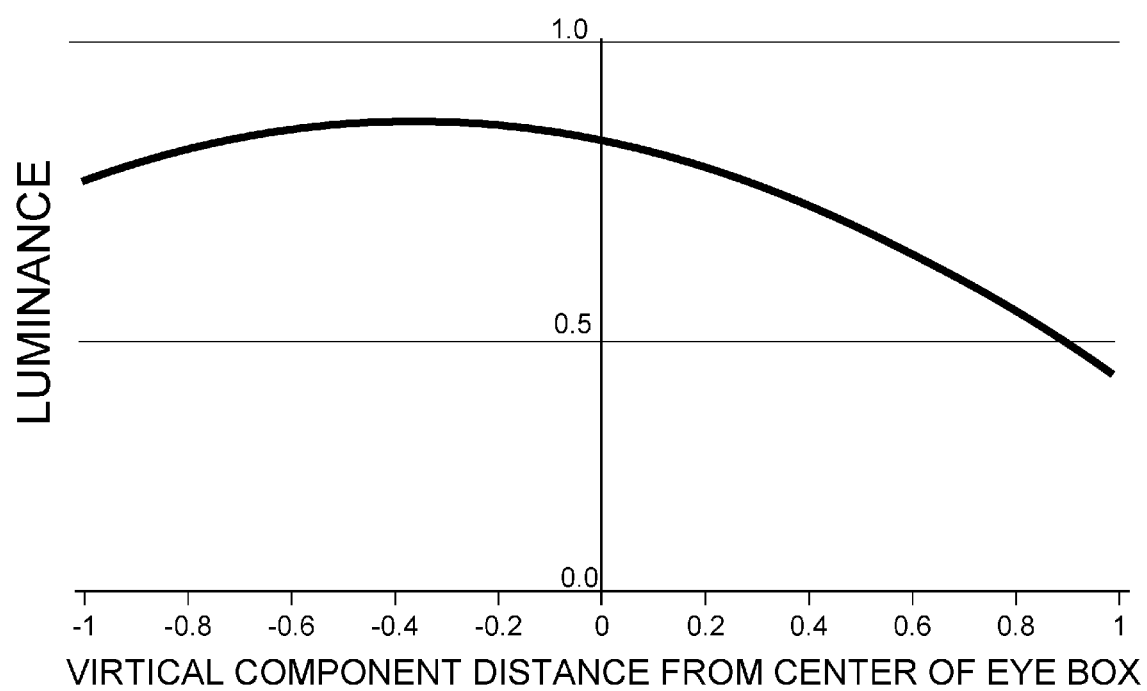
FIG. 7 is a diagram showing a display image luminance distribution of a head-up display 100.
Figure 11:
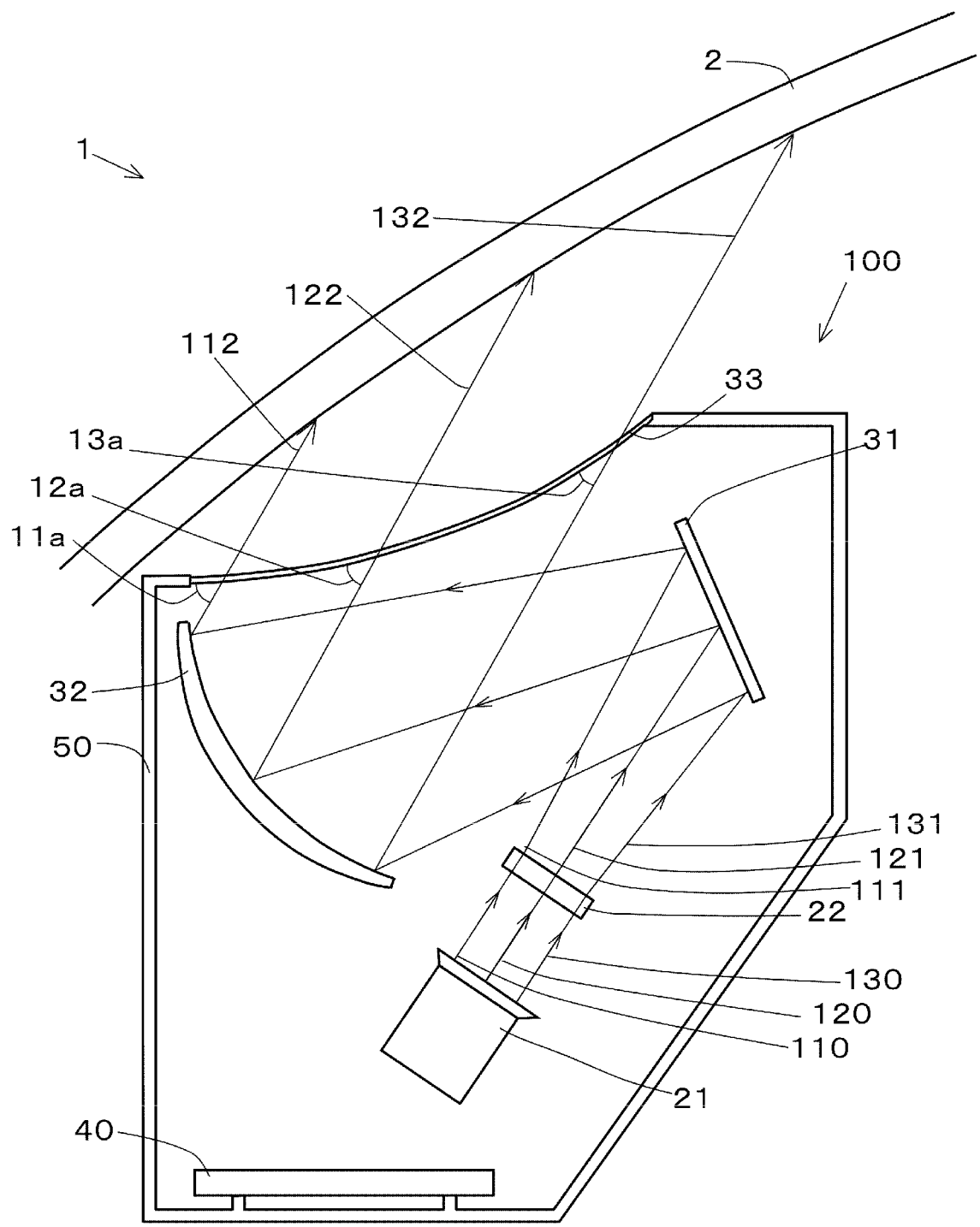
FIG. 11 is a diagram showing a cross section of the head-up display 100.

Here, a conventional method will be described with reference to FIG. 11. Since the members denoted by the same reference numerals are the same as the members shown in FIG. 2, and the detailed description thereof will be omitted. The head-up display 100, which is a conventional display device, holds the projection type image display unit 21 at a position where the display optical axis 121 coincides with the illumination optical axis 120, and emits the display light L, unlike the head-up display 10 of the present embodiment. The distribution of the display image luminance in this case is shown in FIG. 7. More specifically, the vertical axis indicates the luminance when the target point of the corresponding display image is visually recognized at each of the viewpoints EP. As a measurement method, the viewpoint EPs at the upper end, the center, and the lower end indicate the luminance values when the upper end, the center, and the lower end of the display image are measured, respectively. In this way, the conventional art has a luminance distribution obtained by multiplying the graph of FIG. 5 and the graph of FIG. 6. That is, the display image luminance at the upper end of the eye box EB where the incident angle on the cover glass 33 becomes steep is significantly lower than the display image luminance at the lower end, and thus the evenness of the display image luminance is lowered.

Returning to the present embodiment, a method of setting a predetermined angle of the head-up display 10 in the present embodiment will be described.

In the head-up display 10 of the present embodiment, which has the light transmittance distribution and the illuminance distribution having directivity as shown in FIGS. 5 and 6, the projection type image display unit 21 is held at a predetermined angle in a direction in which the evenness of the display image luminance is improved at the lower end and the upper end from the center of the eye box in the vertical direction.

In particular, it is desirable that the axis on which the light transmittance decreases monotonically is not in the left-right direction of the eye box EB, but in the vertically upward direction of the eye box EB, and the light transmittance distribution is provided at the predetermined angle in the direction of the upper end illumination light 130 corresponding to this.

In particular, the predetermined angle is preferably equal to or greater than 0.1 degrees and equal to or less than 10 degrees.

In particular, the predetermined angle is preferably only the angle toward the upper end illumination light 130. Thereby, the head-up display of the present disclosure has a structure with an optical system that is tilted toward the left and right of the vehicle and transmits and reflects to provide the display image V, allows to easily design each head-up display for a right-hand drive vehicle and a left-hand drive vehicle, and becomes a head-up display that improves the evenness of display image luminance.

Figure 8:
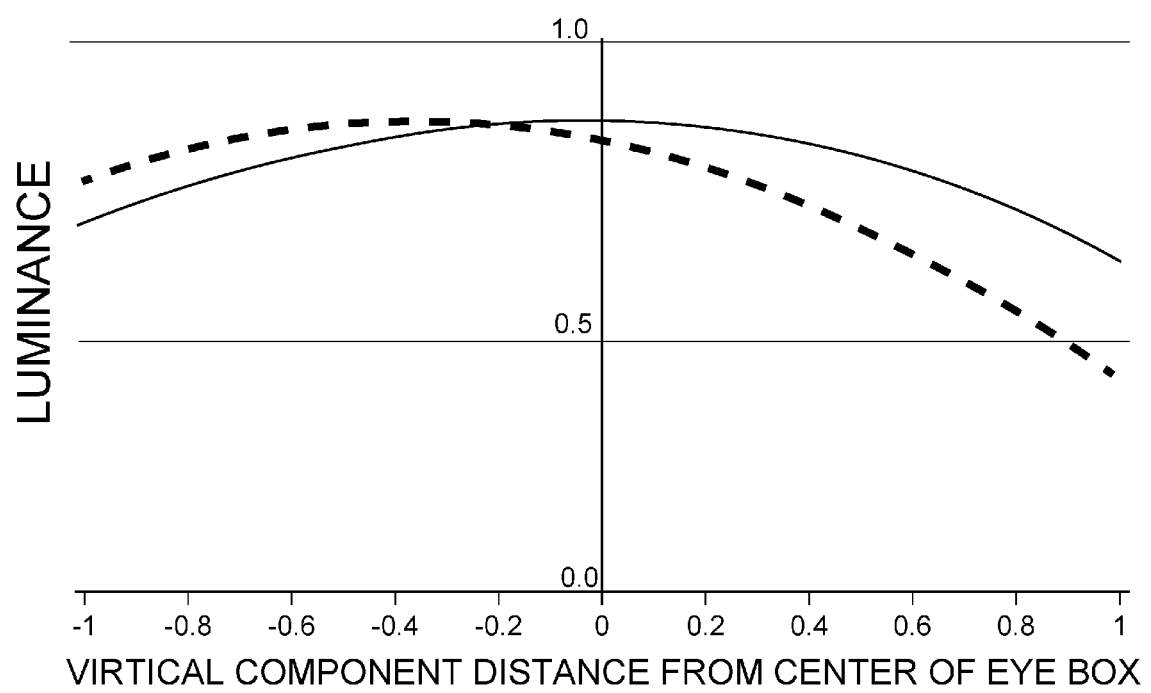
FIG. 8 is a diagram showing display image luminance distributions of the head-up display 10 and the head-up display 100.

In the head-up display 10 provided with the projection type image display unit 21 held by providing the illumination optical axis emission angle $\theta$ having the predetermined angle set as in the preceding paragraph, the distribution of the display image luminance in the eye box EB has the distribution as indicated by the solid line in FIG. 8. The display image luminance distribution of the head-up display 100 shown in FIG. 11 is shown again in the dotted line. The measurement method is equal to FIG. 7. Each display image luminance at the upper end and the lower end, which are significantly separated, approaches each other, so that the evenness is improved.

This means that the illumination unit for illuminating the display optical path in the left-right direction of the vehicle 1 with uniform illuminance is provided. According to the configuration, it is possible to design a head-up display more easily with enhanced evenness. For example, when it is necessary to design each of the head-up display 10 for a model for a right-hand drive vehicle and a model for a left-hand drive vehicle, it is considered that the illumination unit and the display unit are provided with a single package that forms a portion of the housing 50 and is shared by both of the models. In this case, if a predetermined angle is also provided in the left-right direction of the vehicle 1, the sharing becomes difficult because the shape of the windshield 2 differs at the left and right sides of the vehicle 1. On the other hand, by intentionally providing the predetermined angle $\theta$ only in this direction component, it becomes easy to obtain a package common to both of the models.

Therefore, it is possible to provide the display device and the head-up display device that improve the evenness of the display image.

Although the display device and the head-up display device of the present disclosure have been described as examples in the configuration of the above-described embodiment, the present invention is not limited thereto. Various improvements and display change can be made without departing from the spirit of the present invention, in other configurations as well.

2. Modification Example

A modification example of the display device and the head-up display device of the present disclosure is shown.

2-1. First Modification Example

Figure 9:
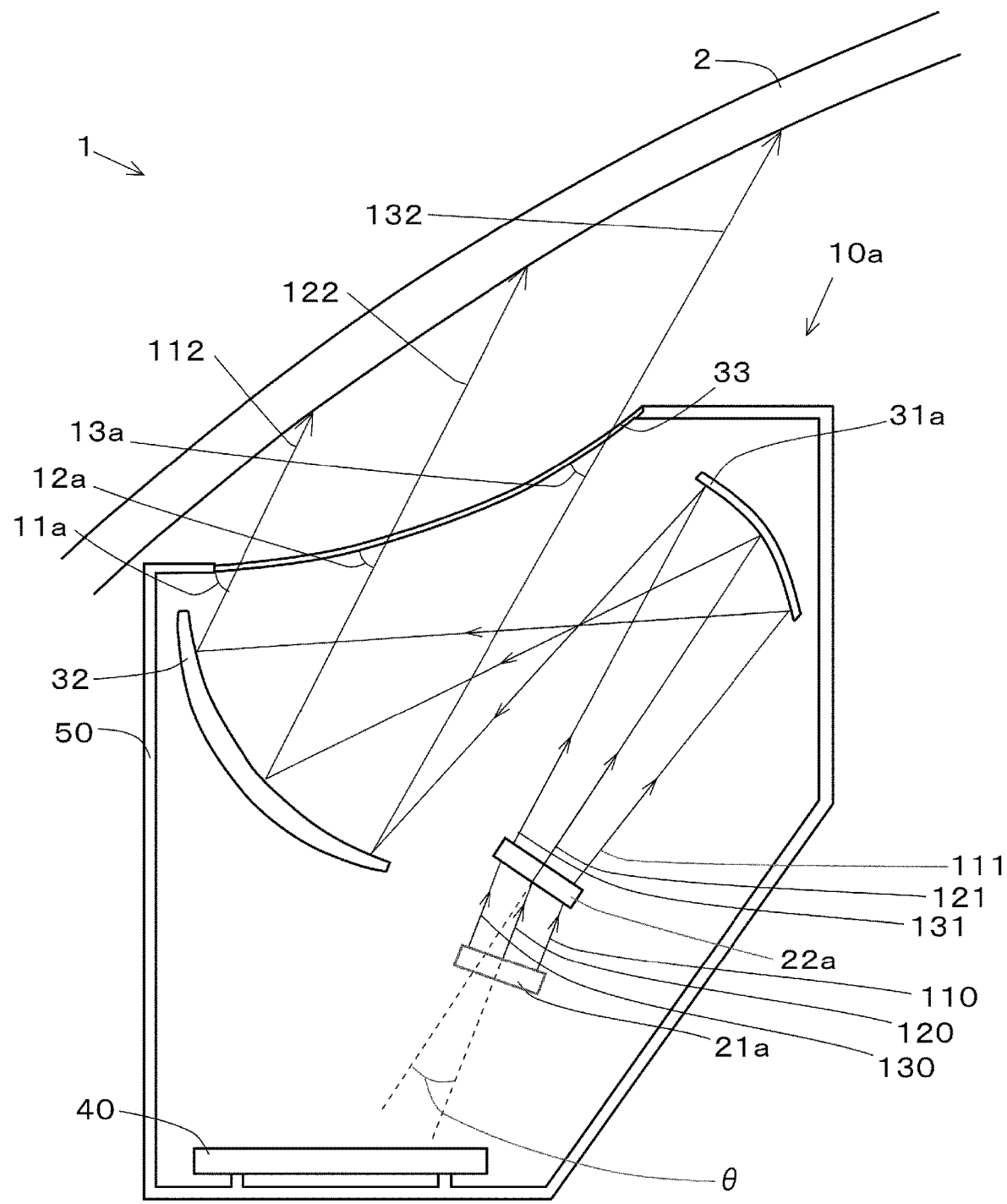

FIG. 9 shows a head-up display 10a. Since the members denoted by the same reference numerals are the same members as those in the first embodiment, the description thereof will be omitted.

The head-up display 10a includes a backlight unit 21a as the illumination unit, and a liquid crystal display element 22a or a correction mirror 31a as the display unit.

The backlight unit 21a has a substrate that can be formed of glass epoxy, at least one LED (light source) that is point-symmetrically arranged on one surface of the substrate, and a connection terminal, which is connected to the LED by wiring of copper foil. The LED blinks in response to a control signal transmitted from the control unit 40 connected via the connection terminal. Each LED emits illumination light with directivity in the direction normal to the surface of the substrate on which each LED is mounted.

The liquid crystal display element 22a has a structure in which a TFT (thin-film transistor) substrate, a color filter, and a polarizing plate are laminated by a known method such as screw holding with screws and adhesive holding with adhesive members, a drive driver, and a connection terminal. The liquid crystal display element 22a changes the orientation of the liquid crystal in the TFT substrate according to the control signal transmitted from the control unit 40 connected via the connection terminal, thereby switching between transmitting and blocking the light. In the present disclosure, the first display light is emitted by displaying the above-mentioned operation-related information and being illuminated by the illumination lights 110, 120, and 130.

The correction mirror 31a is a reflective member in which at least one axis of the reflective surface is a concave surface, and reflects the first display light while converging the first display light toward the concave mirror 32. The correction mirror 31a has a configuration in which the focal point of the correction mirror 31a is closer than the concave mirror 32, and the optical paths cross when viewed from the illustrated direction.

In this way, even in a configuration in which the backlight unit 21a and the liquid crystal display element 22a are used instead of the projection type image display unit 21 and the screen 22, and even if the optical paths of the display light L cross on the way, the illumination optical axis emission angle θ can be set according to the method of setting the predetermined angle described in the first embodiment.

2-2. Modification Example of Illumination Unit and Display Unit

FIGS. 10(a), 10(b), 10(c), 10(d), and 10(e) show examples of combinations of the illumination unit and the display unit, which are provided with the illumination optical axis emission angle θ having the predetermined angle. These modification examples show the combination of the illumination unit and the display unit for emitting the display light L to the optical system not shown which is present in the right direction in the drawing, and the optical system has a predetermined light transmittance distribution in the projection direction. The light transmittance distribution has an axis in which the light transmittance decreases in the downward direction in the drawing. Each illumination unit emits one end illumination light 210, central illumination light 220, and other end illumination light 230 as shown in the drawing. The illuminance distribution includes at least one peak illuminance point, is point-symmetric about the illumination optical axis, and has a distribution in which an illuminance at an outer edge of the illumination light path is smaller than the peak illuminance. The display light L has a bright end display light 211, a central display light (display optical axis) 221, and a dark end display light 231 from the upper direction in the drawings, as shown in the drawing.

Figure 10A:
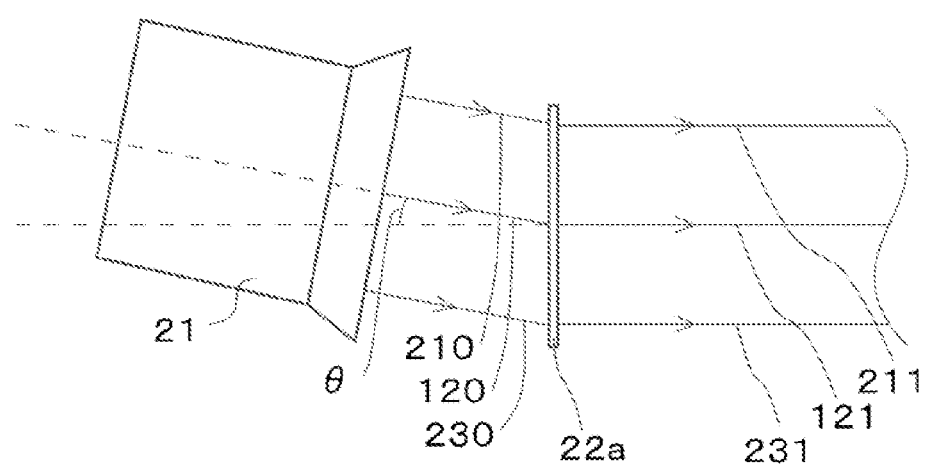
FIGS. 10a-10e are diagrams showing an example of an illumination unit and a display unit to which an illumination optical axis emission angle θ is applied.
Figure 10B:
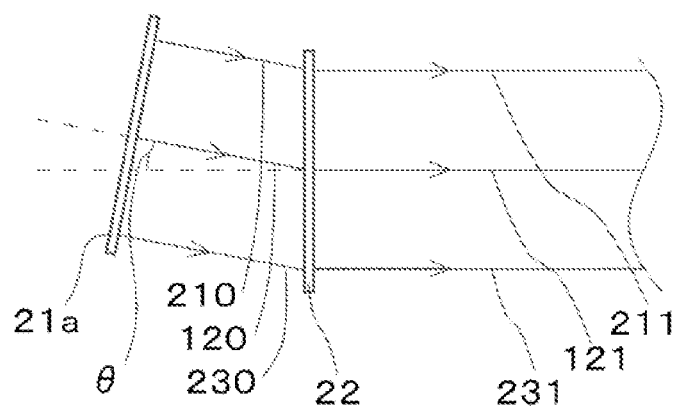

Since FIGS. 10(a) and 10(b) correspond to the configurations of the first modification example and the first embodiment, respectively, the description for each drawing will be omitted.

Figure 10C:
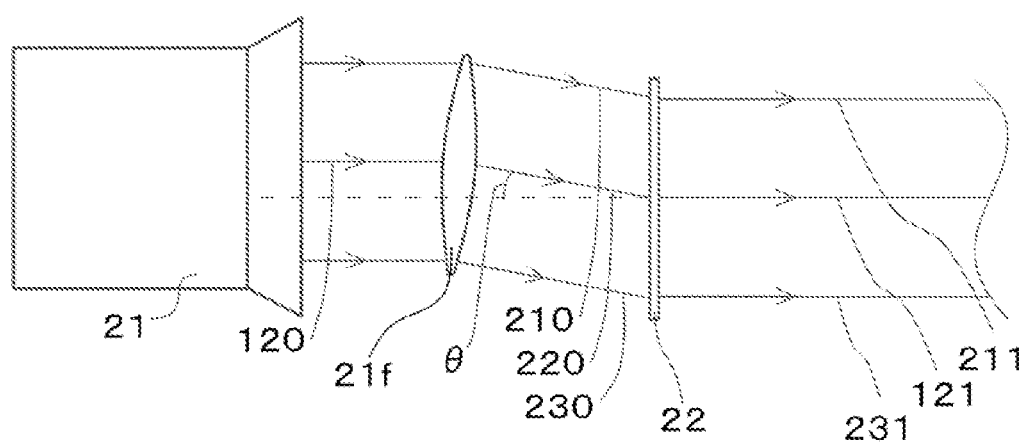

The configuration as shown in FIG. 10(c) may be employed. There is a configuration in which the projection type image display unit 21, the field lens 21f, and the screen 22 are used. The projection type image display unit 21 is provided at a position where the central illumination light 120 is not coaxial with the display optical axis while the central illumination light 120 is emitted in parallel to the display optical axis 121. The field lens 21f is a lens having a convex shape on both sides, which can be made of transparent resin or glass, and refracts the illumination optical axis 120 to emits it to the screen as the central illumination light 220, so that the illumination light with the illumination optical axis emission angle θ may be realized.

Figure 10D:
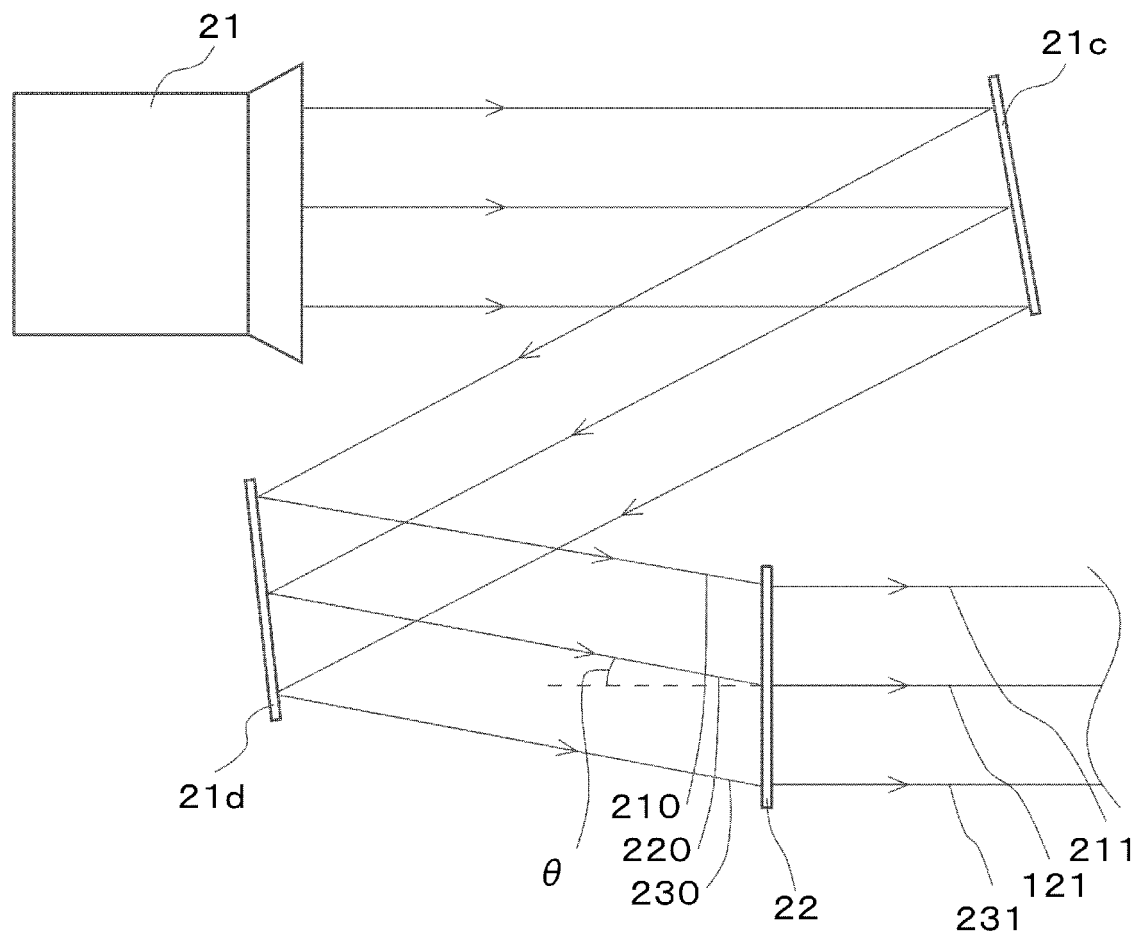

The configuration shown in FIG. 10(d) may be employed. The configuration in FIG. 10(d) is a configuration using the projection type image display unit 21, a first reflexing mirror 21c, and a second reflexing mirror 21d. The projection type image display unit 21 is provided at a position where the central illumination light 120 is not coaxial with the display optical axis while the central illumination light 120 is emitted in parallel to the display optical axis 121. Therefore, the illumination light having the illumination optical axis emission angle θ may be realized by arranging the first reflexing mirror 21c and the second reflexing mirror 21d such that the illumination light is incident on the screen with the illumination optical axis emission angle θ and providing the illumination light emission angle θ with these mirrors.

Figure 10E:
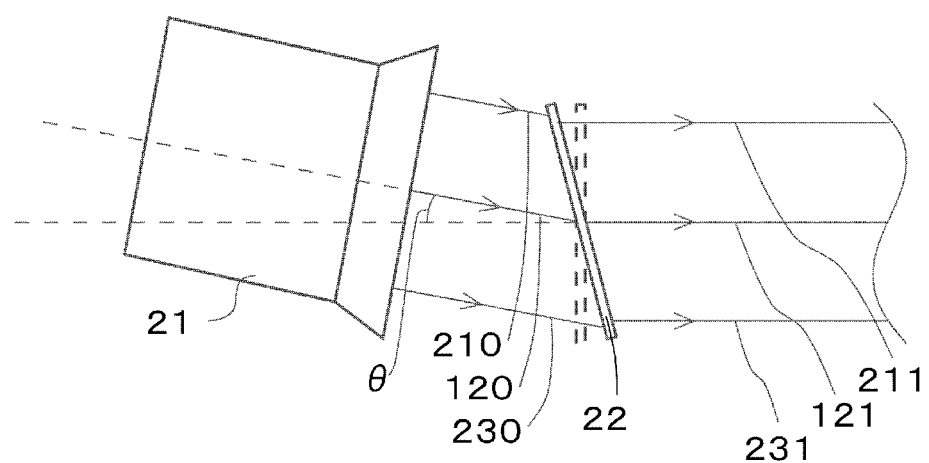

The configuration illustrated in FIG. 10(e) may be employed. The configuration in FIG. 10(e) is a configuration in which the projection type image display unit 21 and the screen 22 are used. There is a configuration in which the screen 22 is held with an inclination of a predetermined angle with respect to the display optical axis 121, in addition to the configuration in FIG. 10 (a). This configuration has an effect of reducing a possibility that the projection type image display unit 21 is illuminated and heated by passing through the screen 22 when strong external light (for example, sunlight) is incident from the right direction in the drawing. Even in such a configuration, the illumination light having the illumination optical axis emission angle θ with respect to the display optical axis 121 may be incident on the screen.

The configuration in which an inclination is provided to the screen 22 has an additional effect. For example, in the configuration in which the screen 22 is held on the housing 50 without inclination as in the head-up display 10 in FIG. 2, when sunlight passes through the windshield 2, travels backward in the path of the display light L, and enters the screen 22, there is a possibility that a phenomenon of traveling to the eye box EB by passing through the same optical path as the display light L occur. When this phenomenon occurs, an occupant can see as if the display image V is overexposed. However, the configuration in which the screen 22 is held at an inclination also has an effect of reducing the amount of light reflected in the projection direction of the display light L when the screen 22 reflects the external light, and suppressing the deterioration of display quality due to the external light.

There is one point to keep in mind when inclining the screen 22. That is the point when the screen 22 is provided with the inclination, the display at a position far from the projection type image display unit 21 becomes dark. In the case of adopting the similar configuration, when calculating the light transmittance distribution of the optical system, it is necessary to set the illumination optical emission angle θ in which the evenness of the display image luminance is improved at the desired point, taking into consideration the influence of the light transmittance distribution due to the inclination of the screen 22.

In the present disclosure, a plurality of combinations of the illumination unit and the display unit each having the illumination optical axis emission angle θ by the single method are illustrated. It is possible to select any of these as long as they can be realized depending on the convenience in product design. In addition, the illumination optical axis emission angle θ does not have to be provided by the single method.

For example, in a configuration including the projection type image display unit provided and held with a first illumination optical axis emission angle θ1 smaller than the illumination optical axis emission angle θ, the field lens 21f, and the screen 22, the field lens 21f, which refracts by the amount of a second illumination optical axis emission angle θ2 corresponding to the difference between the illumination optical axis emission angle θ and the first illumination optical axis emission angle θ1, is provided between the projection type image display unit 21 and the screen 22, so that, as a result, the central illumination light 220 may be incident on the screen 22 with the illumination optical axis emission angle θ. Even at this time, it is necessary to set the central illumination light 220 to be incident on the portion of the screen corresponding to the display optical axis 121.

2-3. Other Modification Examples

Although the combination of the illumination unit and the display unit and the method of providing the illumination optical axis emission angle θ have been mainly illustrated as the modification example, there are other modification examples. For example, although the method of calculating the light transmittance distribution in consideration of the transmittance of the screen 22 is exemplified in the modification examples, the design may be made in consideration of the light transmittance distribution of the windshield 2. In the windshield 2, the display light L reaches the eye box EB direction by being reflected. Here, the windshield 2 is a transparent member, and therefore, there is also display light transmitted through the windshield 2. As the incidence angle decreases, the reflectance decreases. Therefore, the reflectance may be regarded as the light transmittance, and the design may be taken in consideration when calculating the light transmittance distribution. In other words, the design which calculates the reflectance distribution of the reflective member included in the optical system constituting the display device and the head-up display device of the present disclosure as the light transmittance when calculating the light transmittance distribution in the projection direction may be adopted.

So far, the head-up display with enhanced evenness of the display image luminance has been shown, based on the light transmittance distribution of the optical system. However, in order to improve the evenness of the display image luminance, the evenness of the display image luminance may be improved, based on the attenuation rate distribution of the display light L to the eye box EB. Here, the attenuation rate refers to the ratio of energy before and after light is reflected or transmitted. The energy of light is attenuated because absorption, scattering, reflection, or transmission of light occurs through the reflection or transmission.

The attenuation rate distribution shows a distribution showing the ratio of the energy of the display light L immediately after emission to the energy of the display light L after being attenuated due to absorption, scattering, reflection, transmission, and the like to the eye box EB, when the ratio is plotted on a plane on which the display light L travels, for example. The attenuation rate distribution can be obtained, for example, by actual measurement or simulation. The illumination unit in which the angle θ is provided based on the attenuation rate distribution and the illuminance distribution allows to provide the head-up display with enhanced evenness of the display image luminance.

Further, it is possible to count in the attenuation rate of the light generated by the display unit in the attenuation rate distribution. The display unit is the starting point of the display light. The illumination light is modulated by the display unit to emit the display light. It goes without saying that the light is attenuated by the modulation. Therefore, based on the attenuation rate distribution in consideration of the attenuation, the illumination optical axis may be provided with an angle that improves the evenness of the display image luminance.

The attenuation due to reflection may occur, for example, in a mirror, and a reflective screen. The attenuation due to transmission may occur, for example, in a lens, and a cover glass. The attenuation due to absorption may occur in any optical member through which the display light passes. Further, the attenuation can occur based on the fact that a portion of the display light deviates out of the display optical path due to scattering by refraction or diffuse reflection. However, it is not necessary to consider all of them. It is possible to obtain the effect by calculating an angle that improves the evenness, based on the attenuation rate distribution in consideration of at least one of the causes of the attenuation.

Figure 12:
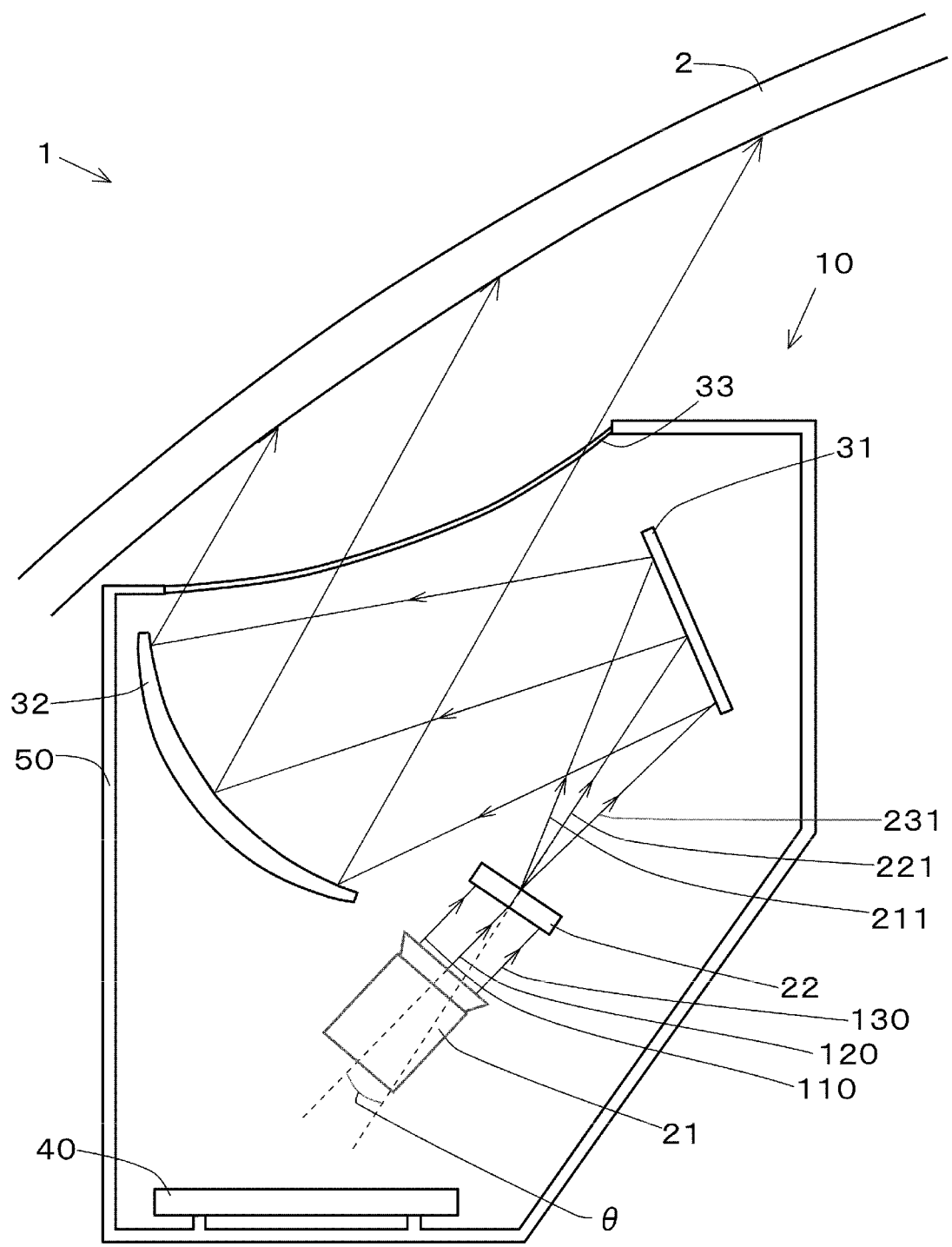
FIG. 12 is a diagram showing a modification example of the measurement method of display image luminance.

Further, as a modification example of the measurement method, the display image luminance may be measured based on the luminance when the center of the display image V is visually recognized from a plurality of viewpoints EP as shown in FIG. 12, and the evenness of the display image luminance may be calculated based on the measured value.

Further, as the setting of the predetermined angle, even if there is an axis monotonously decreasing the light transmittance in the light transmittance distribution, it does not necessarily have to be the predetermined angle having an angle only in the axial component. The effect of the present invention can be obtained as long as the predetermined angle having the angle component is provided in the direction in which at least the display image luminance improves.

Further, as the setting of the predetermined angle, even if there is no an axis monotonously decreasing the light transmittance in the light transmittance distribution, the effect of the present invention can be obtained by providing the predetermined angle in a direction in which the evenness obtained from the display image luminance measured by a predetermined method is improved.

In addition, in the conventional head-up display, there is a head-up display capable of adjusting the angle of the optical system and adjusting the path of the display light in accordance with the physical size and the posture of the occupant. For example, there has been known a head-up display capable of adjusting the path by rotationally driving a concave mirror. The present invention is applicable even when the angle or position of such an optical system can be also adjusted. For example, by rotationally driving the concave mirror 32 in FIG. 11, the effect of the present invention can be obtained by setting the predetermined angle θ with a state between a state in which the projection position of the windshield 2 is completely moved upward (Torah position) and a state in which the projection position of the windshield 2 is completely moved downward (shorter position), especially with the just the intermediate state.

Figure 13:
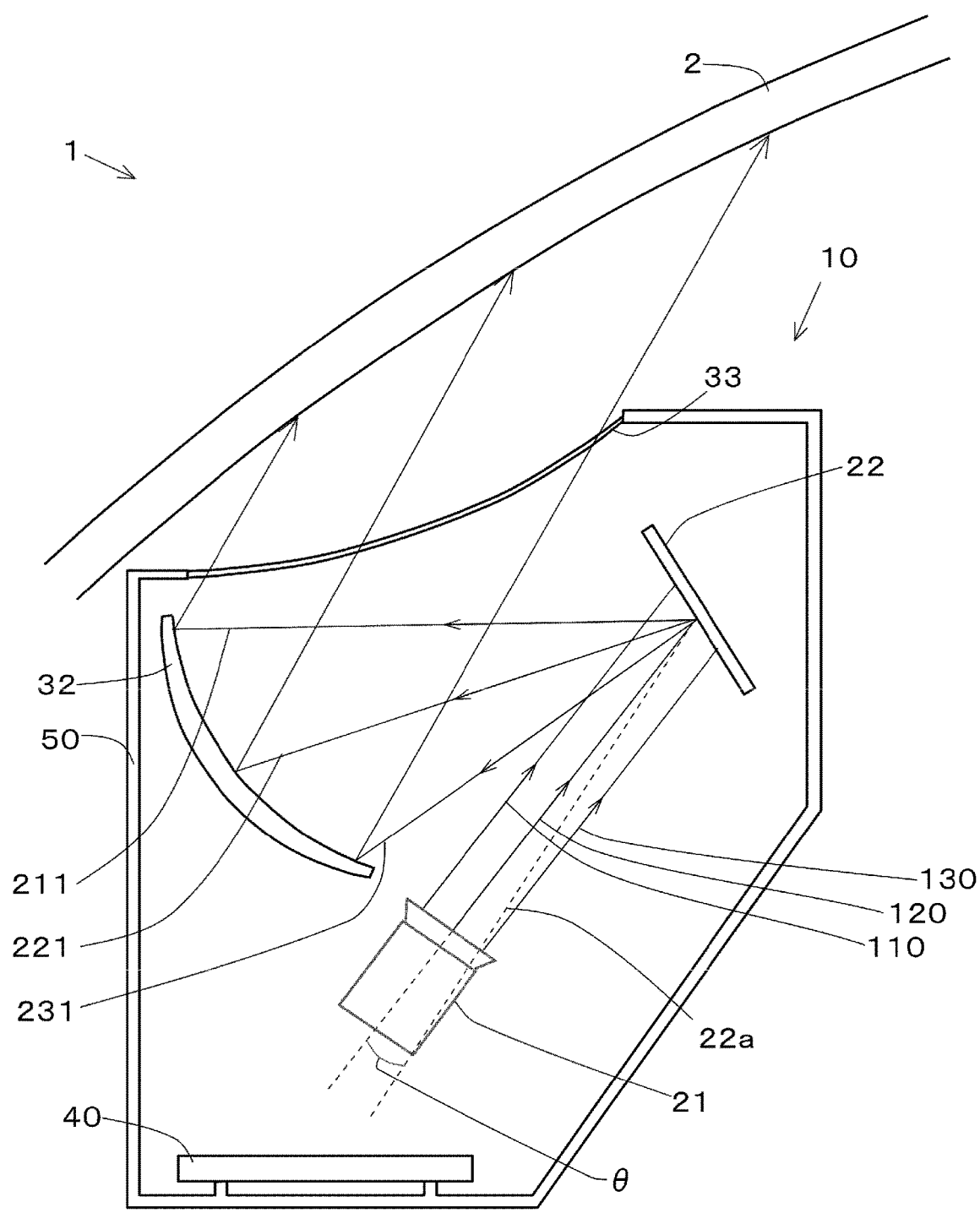
FIG. 13 is a diagram showing an example of the illumination unit and the display unit to which the illumination optical axis emission angle θ is applied.
which the illumination optical axis emission angle θ is applied.

As another aspect, a head-up display 10b as shown in FIG. 13 may be used. The description of the members denoted by the same reference numerals will be omitted. The head-up display 10b has the screen 22. In particular, the screen 22 is a reflective screen. For example, the screen 22 is a micromirror array. In this case where the micromirror array is used, it is preferable to use a display using a laser diode.

In the above description, well-known techniques are omitted as appropriate to facilitate the description.

3. Effect Example

First, the display device 10a described above includes the backlight unit 21a (an example of the illumination unit) that includes the light source and emits the illumination lights 110, 120, and 130, the liquid crystal display element 22a (an example of the display unit) that displays an image and emits display light L when the image is illuminated with the illumination light 110, 120, and 130, the control unit 40 that controls the illuminance of the backlight unit 21a and the display of the liquid crystal display element 22a, the housing 50 that includes an opening through which the display light L passes and houses the liquid crystal display element 22a and the backlight unit 21a, and the optical system that performs at least one of reflection and transmission in at least one portion in the display optical path, and projects the display light L that has passed through this, the optical system has a predetermined attenuation rate distribution with respect to visible light in the projection direction of the display light L, the attenuation rate distribution is non-symmetric with respect to the display optical axis 121, and the backlight unit 21a emits the illumination light of the illumination optical axis 120 at which the predetermined angle θ is provided with respect to the display optical axis 121 to improve the evenness of the display image luminance.

According to the configuration, as described above, the evenness of the display image luminance is improved, and a display device with a small change in the display image luminance when the viewpoint EP moves in the eye box EB can be obtained.

Second, in the display device 10a, the optical system transmits the display light L, for example, with the cover glass 33, and the attenuation rate distribution is a distribution in consideration of the transmittance of the optical system with respect to the display light.

The attenuation rate distribution is the transmittance distribution in the display optical path. When the display light L travels through the optical path having the transmittance distribution to be displayed, the backlight unit 21a may be provided in the state where the illumination optical axis 120 is added to the display optical axis 121 and the predetermined angle θ is provided to improve the evenness of the display image luminance.

Third, the display device 10a reflects the display light L in the optical system, and the attenuation rate distribution is the distribution in consideration of the reflectance of the optical system with respect to the display light L.

The attenuation rate distribution is the reflectance distribution in the display optical path. When the display light L travels through the optical path having the reflectance distribution to be displayed, the backlight unit 21a may be provided in the state where the illumination optical axis 120 is added to the display optical axis 121 and the predetermined angle θ is provided to improve the evenness of the display image luminance.

Fourth, in the display device 10a, the backlight unit 21a has the illuminance distribution with directivity, and the illuminance distribution includes at least one peak illuminance point, and is point-symmetric about the illumination optical axis 120, and the illuminance at the outer edge of the illumination light path is smaller than the peak illuminance.

Fifth, in the display device 10a, the attenuation rate distribution has the axis in which the light transmittance decreases monotonically. The predetermined angle θ is set so that the evenness of the display image luminance is improved in two optical paths passing through the tip point of the axis and the end point of the axis passing through the display optical axis 121.

Sixth, in the display device 10a, the predetermined angle is greater than or equal to 0.1 degrees and less than or equal to 10 degrees.

On the other hand, seventh, the head-up display 10a described above is the head-up display 10a that provides vehicle information to an occupant of the vehicle 1, by emitting an image including vehicle information as the display light L and projecting the image including the vehicle information onto the windshield 2 (an example of transmissive reflective member) of the vehicle 1, the head-up display 10a includes: the illumination unit that includes the light source and emits the illumination lights 110, 120, and 130, the liquid crystal display element 22a (an example of the display unit) that displays an image and emits the display light L by the image being irradiated with the illumination lights 110, 120, and 130, the control unit 40 that controls the illuminance of the backlight unit 21a and the display of the liquid crystal display element 22a, the correction mirror 31a, the concave mirror 32, and the cover glass 33 (an example of the optical system) that are the optical system for providing the display light L to the occupant by performing both reflection and transmission in at least one place in the display optical path, the housing that includes the opening through which the display light L passes, and houses the liquid crystal display element 22a, the backlight unit 21a, and the optical system, and the cover glass 33 that is formed of a transparent member having a uniform thickness, covers the opening, transmits the display light L, and configures a part of the optical system, the optical system has the predetermined attenuation rate distribution with respect to visible light in the projection direction of the display light L, the attenuation rate distribution is non-symmetric with respect to the display optical axis 121, and the backlight unit 21a emits the illumination light, which is the illumination optical axis 120 having the predetermined angle θ with respect to the display optical axis 121 to improve the evenness of the display image luminance.

Eighth, in the head-up display 10a, the attenuation rate distribution is the distribution in consideration of the transmittance of the optical system with respect to the display light L.

The attenuation rate distribution is the transmittance distribution in the display optical path. When the display light L travels through the optical path having the transmittance distribution to be displayed, the backlight unit 21a may be provided in the state where the illumination optical axis 120 is added to the display optical axis 121, so that the predetermined angle θ is provided to improve the evenness of display image luminance.

Ninth, in the head-up display 10a, the attenuation rate distribution is the distribution in consideration of the reflectance of the optical system with respect to the display light L.

The attenuation rate distribution is the reflectance distribution in the display optical path. When the display light L travels through the optical path having the reflectance distribution to be displayed, the backlight unit 21a may be provided in the state where the illumination optical axis 120 is added to the display optical axis 121, so that the predetermined angle θ is provided to improve the evenness of display image luminance.

Tenth, in the head-up display 10, the backlight unit 21a includes the illuminance distribution with directivity, and the illuminance distribution includes at least one peak illuminance point, is point-symmetrical about the illumination optical axis, and the illuminance at the outer edge of the illumination optical path is smaller than the peak illuminance.

Eleventh, the attenuation rate distribution includes the axis in which the attenuation rate increases monotonically, and the predetermined angle θ is set so that the evenness of the display image luminance is improved in two optical paths passing through the tip point of the axis and the end point of the axis passing through the display optical axis 121.

Twelfth, in the head-up display 10a, the cover glass 33 rises at the rear side of the vehicle 1, when the display light L passes through the cover glass 33, the display light L passes with an elevation angle in the rearward direction of the vehicle 1, display image visually recognized by the occupant is a rectangle, and the predetermined angle includes the angle of the directional component toward a display region of the display unit corresponding to at least the upper edge of the display image.

Thirteenth, in the head-up display 10a, the predetermined angle θ is the angle of only the directional component.

Fourteenth, in the head-up display 10a, the predetermined angle θ is greater than or equal to 0.1 degrees and less than or equal to 10 degrees.

Fifteenth, in the head-up display 10a, the optical system can adjust the angle to adjust the path of the display light L within a predetermined range, and the predetermined angle θ is set so that the evenness is improved under the condition that the adjustable angle is single.

DESCRIPTION OF REFERENCE NUMERALS

1 VEHICLE
2 WINDSHIELD
10 HEAD-UP DISPLAY (DISPLAY DEVICE)
L DISPLAY LIGHT
V DISPLAY IMAGE
EP VIEWPOINT
EB EYE BOX
T EYE BOX UPPER END
B EYE BOX LOWER END
21 PROJECTION TYPE IMAGE DISPLAY UNIT
22 SCREEN
31 COLD MIRROR
32 CONCAVE MIRROR
33 COVER GLASS
40 CONTROL UNIT
50 HOUSING
θ ILLUMINATION OPTICAL AXIS EMISSION ANGLE (PREDETERMINED ANGLE)
110 LOWER END ILLUMINATION LIGHT
120 CENTRAL ILLUMINATION LIGHT (ILLUMINATION OPTICAL AXIS)
130 UPPER END ILLUMINATION LIGHT
111 FIRST LOWER END DISPLAY LIGHT
121 FIRST CENTRAL DISPLAY LIGHT (DISPLAY OPTICAL AXIS)
131 FIRST UPPER END DISPLAY LIGHT
112 SECOND LOWER END DISPLAY LIGHT
122 SECOND CENTRAL DISPLAY LIGHT
132 SECOND UPPER END DISPLAY LIGHT
11A LOWER END OPTICAL PATH INCIDENT ANGLE
12A CENTRAL OPTICAL PATH INCIDENT ANGLE
13A UPPER END OPTICAL PATH INCIDENT ANGLE
21A BACKLIGHT UNIT (ILLUMINATION UNIT)
22A LIQUID CRYSTAL DISPLAY ELEMENT (DISPLAY UNIT)
31A CORRECTION MIRROR
210 ONE END ILLUMINATION LIGHT
220 CENTRAL ILLUMINATION LIGHT (ILLUMINATION OPTICAL AXIS)
230 OTHER END ILLUMINATION LIGHT
211 BRIGHT END DISPLAY LIGHT
231 DARK END DISPLAY LIGHT
21C FIRST REFLEXING MIRROR
21D SECOND REFLEXING MIRROR
21F FIELD LENS

The invention claimed is:

1. A display device comprising:
an illumination unit which comprises a light source and emits illumination light;
a display unit which displays an image and emits display light when the image is illuminated with illumination light;
a computer processing unit (CPU) which controls illuminance of the illumination unit and display of the display unit;
a housing which comprises an opening through which the display light passes, and houses the display unit and the illumination unit; and
an optical system which performs at least one of reflection and transmission at at least one portion in a display optical path, and projects the display light that has passed through the at least one portion in the display optical path,
wherein the optical system comprises a predetermined attenuation rate distribution with respect to visible light in a projection direction of the display light,
wherein the attenuation rate distribution is non-point symmetric with respect to a display optical axis,
wherein the illumination unit emits illumination light of an illumination optical axis at which a predetermined angle is provided with respect to the display optical axis, to improve the evenness of the display image luminance,
wherein the attenuation rate distribution comprises an axis in which a light transmission rate decreases monotonically, and wherein the predetermined angle is set such that the evenness of display image luminance is improved on two optical paths passing through a tip point of the axis and an end point of the axis passing through the display optical axis.

2. The display device according to claim 1, wherein the predetermined angle is equal to or greater than 0.1 degrees and equal to or less than 10 degrees.

3. The display device according to claim 1,
wherein the optical system can adjust an angle to adjust a path of the display light within a predetermined range, and
wherein the predetermined angle is set to improve the evenness under a state in which the angle is single.

4. A head-up display device for emitting an image comprising vehicle information as display light and projecting the image to a transmissive reflective member of a vehicle, to provide the vehicle information to an occupant of the vehicle, the head-up display device comprising:
an illumination unit which comprises a light source and emits illumination light;
a display unit which displays the image and emits the display light when the image is illuminated with the illumination light;
a computer processing unit (CPU) which controls illuminance of the illumination unit and display of the display unit;
an optical system which provides the display light to the occupant by performing both reflection and transmission at at least one portion in a display optical path;
a housing which comprises an opening through which the display light passes, and houses the display unit, the illumination unit, and the optical system; and
a cover glass which is formed of a transparent substrate comprising a uniform thickness, covers the opening, transmits the display light, and constitutes a portion of the optical system,
wherein the optical system comprises a predetermined attenuation rate distribution with respect to visible light in a projection direction of the display light,
wherein the attenuation rate distribution is non-point symmetric with respect to a display optical axis,
wherein the illumination unit emits the illumination light which is an illumination optical axis at which a predetermined angle is provided with respect to the display optical axis, to improve the evenness of display image luminance,
wherein the cover glass rises at a rear side of the vehicle,
wherein when the display light passes through the cover glass, the display light passes with an elevation angle in a rearward direction of the vehicle,
wherein a display image visually recognized by the occupant is a rectangle, and
wherein the predetermined angle comprises an angle only directed toward a display region of the display unit corresponding to at least an upper edge of the display image.

* * * * *